248-499 SR
4/7/87 OR H 000,256

United States Statutory Invention Registration [19]

[11] Reg. Number: H256

[43] Published: Apr. 7, 1987

Annibale et al.

[54] WHEEL STOP AND TIE-DOWN FOR AIRCRAFT CARRIER FLIGHT AND ELEVATOR DECKS

[75] Inventors: Joseph R. Annibale, Fairfax; Joseph C. Teets, Alexandria, both of Va.

[73] Assignee: The United States of America as represented by the Secretary of the Navy, Washington, D.C.

[21] Appl. No.: 900,127

[22] Filed: Aug. 21, 1986

[51] Int. Cl.[4] ..... B65D 63/00

[52] U.S. Cl. ..... 248/499; 248/503

*Primary Examiner*—Charles T. Jordan
*Assistant Examiner*—Michael J. Carone
*Attorney, Agent, or Firm*—Kenneth E. Walden

[57] ABSTRACT

There is disclosed an aircraft wheel stop and tie-down arrangement for the edge of an aircraft carrier (or other type ships with aviation capability) having flight or elevator decks whereby an aircraft may be secured thereon with a portion of the aircraft extending over the edge, yet restrained from movement.

5 Claims, 8 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WHEEL STOP AND TIE-DOWN FOR AIRCRAFT CARRIER FLIGHT AND ELEVATOR DECKS

BACKGROUND OF THE INVENTION

Aircraft carrier and other type ships with aviation capability having flight and elevator decks are provided with numerous spaced-apart tie down fittings to which hooks on chains connected with aircraft may be removably attached. The tie-down fitting are located every several feet in a regular pattern about the deck where aircraft are to be stored.

Aircraft are normally provided with high strength structural means adjacent the nose wheel and main landing gear for receiving tie-down chains. When a hook at the other end of the chain is fastened into tie-down fittings located generally in opposite direction from both forward and aft locations on the aircraft, the aircraft is secured from movement across a deck resulting from ship dynamic forces and wind loads.

Problems arise when an aircraft on deck is not ideally positioned over the tie-down fittings, and there is no opportunity for obtaining oppositely extending anchoring tie-downs from both fore and aft positions on the aircraft. This situation is further complicated with larger aircraft where it is necessary to let a portion of the aircraft extend over the edge of the storage or elevator deck. There is illustrated in FIG. 1 a situation where aircraft 10 (helicopter) extends over the elevator edge, but is not ideally located with respect to tie down fittings 12, and, therefore, a good athwartship restraint cannot be obtained. While it is possible to reposition the aircraft at an angle on the elevator or storage deck, as illustrated in FIG. 2, for better tie down, it is an awkward location and a time consuming procedure to maneuver the aircraft with tractor and tow bar. An additional aircraft may also be loaded along side an aircraft when positioned as illustrated in FIG. 1.

General specifications for ships of the U.S. Navy require that carriers be provided with additional tie-down capability for aircraft parked with portions of their bodies projecting over the flight and elevator deck edges. The tie-down capabilities are cleats, staples, jack stays and other fitting. The ideal would be for the deck to extend farther outwardly, but this is not possible. Therefore, numerous designs have been proposed to meet the problem. One previous tie-down arrangement for an aircraft 110 is illustrated in FIG. 3. The aircraft is illustrated in parked position on the deck or hanger with its wheels 122 near fixed wheel stop 124 and its tail section 126 hanging over the edge. A tie down chain 128 is attached at one end to the hub of wheel 122 and at the other end to a bulwark 130 forming part of walkway 132 which runs along the edge of the deck. Another tie down chain cable 134 is secured between the bulwark 130 and attachment 136 on the aircraft. Tie down chain 128 restrains the aircraft from movement away from wheel stop 124. The stop prevents the aircraft wheel from running over the edge of the deck. The portion of tie down chain 128 in contact with wheel stop 124 is subject to chafing. Also, tie-down chain 128 is an obstruction to passage along walkway 132.

It is desired that there be provided a wheel stop adjacent the edge of the storage deck or elevator which is capable of defining not only an abutment but a tie-down anchor as well. It is to this objective that the present invention is directed.

SUMMARY OF THE INVENTION

In summary, the invention provides a wheel stop for an aircraft carrier flight, hangar, or elevator deck to prevent aircraft wheels from rolling or being forced over the edge. In addition, the wheel stop is provided with means to which tiedown chains attached to the aircraft can be secured for preventing movement of the aircraft athwartship of the carrier. This arrangement provides the required additional tie down capability when the aircraft body extends over the edge of the deck. It also anchors the aircraft from inward movement and possible damage due to contact with other aircraft or from contact with carrier structure during movement on an elevator. The wheel stop is designed for quick manual attachment to and removal from position at the edge of the deck.

It is therefore an object of the invention to provide an improved wheel stop for the outer edge of a carrier flight or elevator deck.

It is another object of the invention to provide an improved wheel stop providing for plural cable attachments.

It is still another object of the invention to provide a similar capability on portable wheel stop capable of quick manual attachment on or removal from a carrier flight or elevator deck where this is a requirement.

Still other objects of the invention will become apparent to one upon reading the specification in conjunction with the drawings.

DETAILED DESCRIPTION OF THE INVENTION

The invention will now be described by way of example with reference to the drawings.

Figure 1:
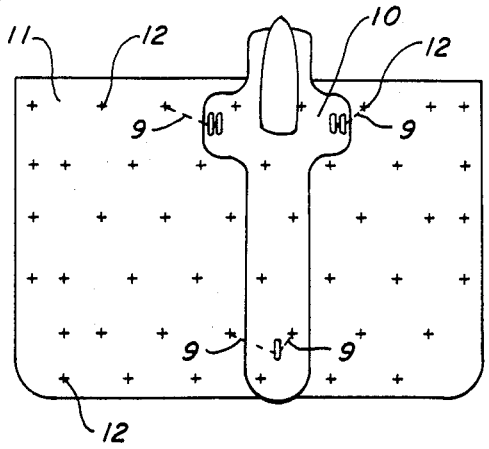
FIG. 1 is a plan view illustrating an aircraft (helicopter) positioned on and overhanging the edge of a carrier or elevator deck, and a mismatch with deck tie-down fittings.
Figure 2:
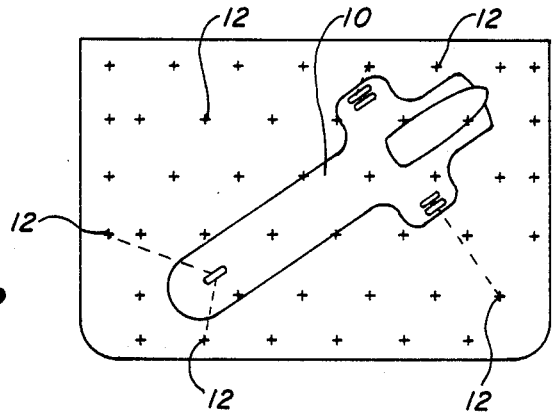
FIG. 2 is a plan view illustrating an aircraft (helicopter) positioned at an angle on a carrier elevator for better match with tie-down fittings.
Figure 3:
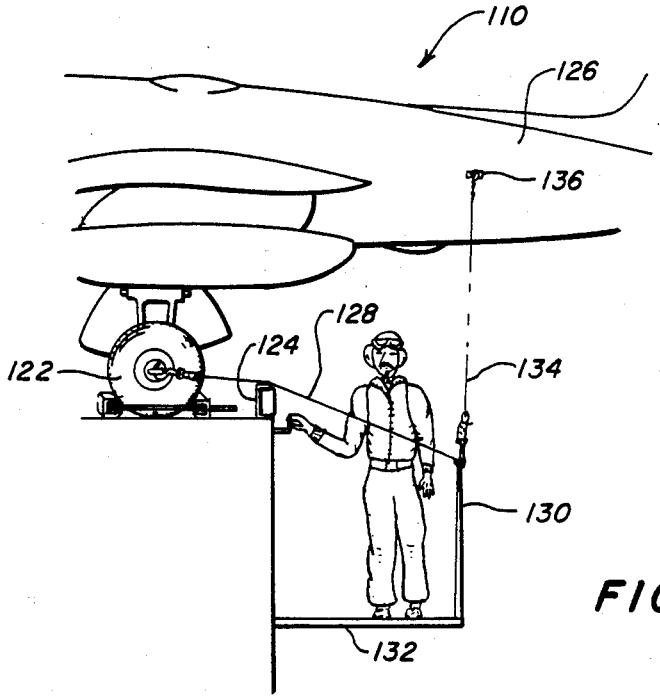
FIG. 3 is a view along the edge of a carrier or elevator deck illustrating a previous wheel stop and tie-down arrangement.

Problems for aircraft tie-down were identified under the background heading wherein reference was made to FIG. 1-3. It is desirable that aircraft, whether fixed or rotatable wing, be secured to the carrier flight or elevator deck in a manner which will permit them, when necessary, to extend over the edge of the deck. It is desirable that the aircraft be tied down in a lateral position as illustrated in FIG. 1 rather than in an angled position as illustrated in FIG. 2.

It will be observed from the illustration in FIG. 1 that the tie-down chains 9 do not extend to securing fittings 12 in opposite directions sufficiently as required to properly secure aircraft 10 from forces, such as from wind or movement of the carrier. It would be necessary to reposition aircraft 10 as illustrated in FIG. 2 so that the chain ends could be fastened to other securing fittings for better tie-down.

There is illustrated in FIG. 3 an arrangement previously used for securing an aircraft 110 in position on a deck with its wheels near the edge and a substantial portion of its body 126 extending beyond. A wheel stop 124 is affixed, such as by bolts or welding, to the deck at the very edge to prevent the wheel from rolling beyond. A tie-down chain 128 has one end attached to the hub of aircraft wheel 122 and its other end attached to a frame member 130, which is a structural part of a walkway extending along below the deck level. The cable runs over the top of the wheel stop. Another tie-down chain 134, also attached to a bulwark 130, runs up to the aircraft where it is secured to anchor 136. As can be observed in FIG. 3, the aircraft tie-down arrangement has shortcomings: (1) chafing of tie-down chain 128 where it contacts wheel stop 124, (2) tie-down chain 128 obstructs the walkway, and (3) tie-down chain 134 serves in no way to restrain the aircraft from athwartship movement.

Figure 4:
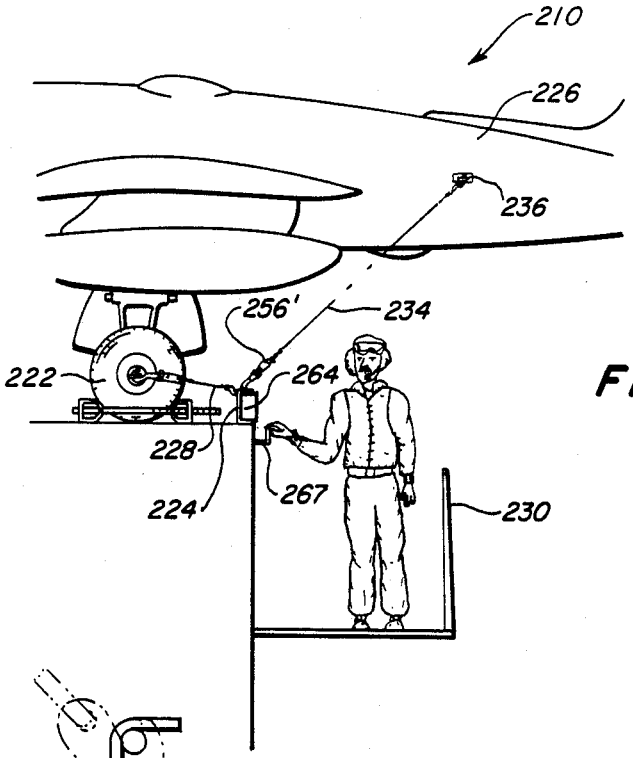
FIG. 4 is a view of a wheel stop and tie down arrangement according to the invention herein.
Figure 5:
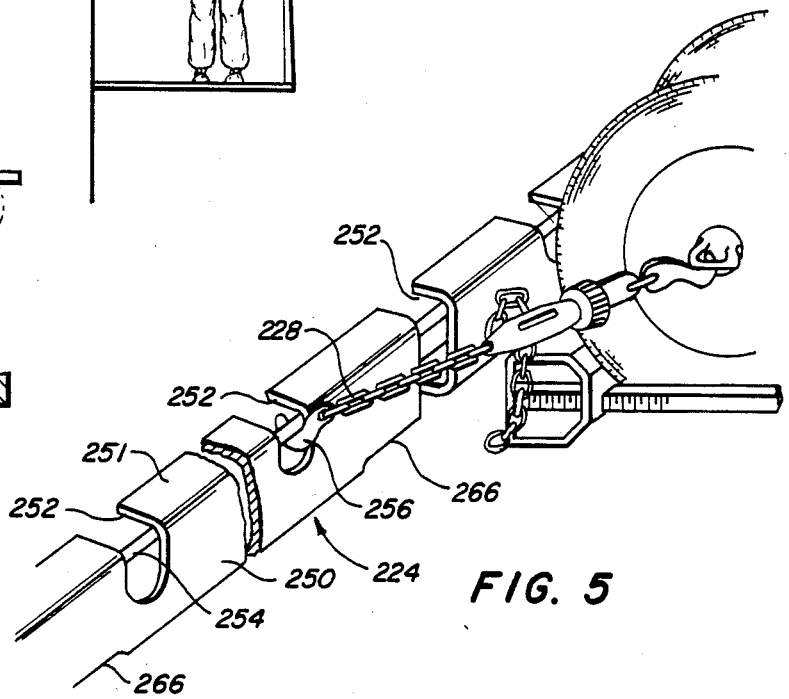
FIG. 5 is a perspective view of the wheel stop and wheel anchor chain attachment according to the invention herein.

The improved arrangement for securing an aircraft at the edge of a flight or elevator deck with its body portion and tail assembly extending over the edge is illustrated in FIG. 4. A wheel stop 224, modified from that illustrated by numeral 124 in FIG. 3, is constructed according to the details illustrated in FIG. 5–7. The stop as illustrated in FIGS. 5, 6, and 7, comprises an upstanding web 250 with inturned flanges 251 on the top and 251′ on the bottom for portable wheel stops. The top flange and web are notched, as indicated by numeral 252, at spaced apart locations along the length of the wheel stop. A rod 254 is welded or otherwise secured in the corner between web 250 and upper flange 251 to provide means at cut-outs 252 for attaching tie-down chain hooks such as hook 256. Bottom flange 251′ of the portable wheel stop is provided with a plurality of key holes 258 whereby the wheel stop can be removed by loosening bolts 259 or nuts over studs 260 which extend upward from the flight or elevator deck. The wheel stop is provided with a series of spaced apart reinforcing ribs 264 to meet strength requirements. Web 250 and lower flange 251′ are provided with notches or cut-outs 266, as illustrated in FIG. 5, for allowing water to drain from the surface of the deck to drain pan 267.

Figure 6A:
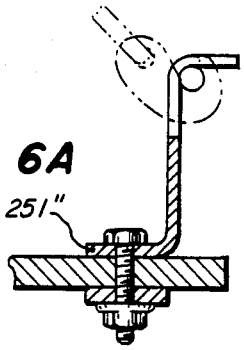
FIG. 6A is a cross-sectional view through the wheel stop of a different configuration.
Figure 6:
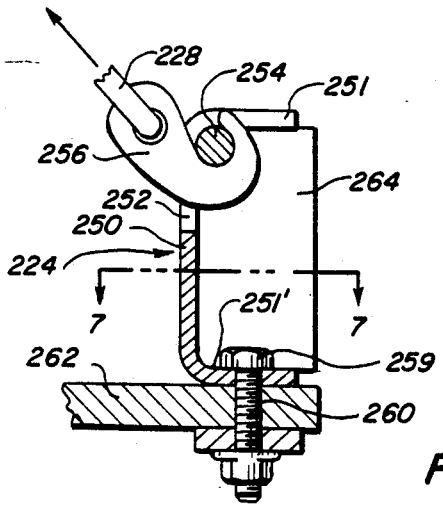
FIG. 6 is a cross-sectional view through the portable wheel stop showing a hold-down bolt and chain hook.
Figure 7:
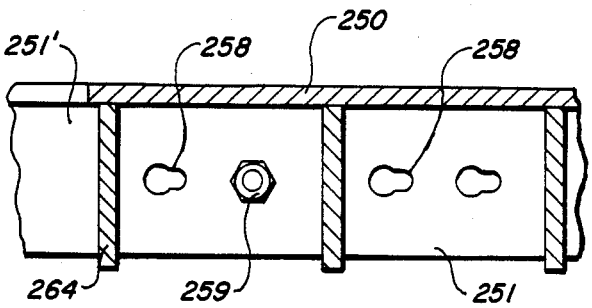
FIG. 7 is a cross-sectional view of FIG. 6 taken along line 7—7.

FIG. 6A illustrated a Z-shaped wheel stop flange and web arrangement substantially matching that of FIG. 6, except tht flange 251″ is turned in the opposite direction from flange 251′ in FIG. 6. Numerals other than 251″ are not applied to the FIG. 6A arrangement.

Aircraft 210 is illustrated in FIG. 4 as positioned adjacent the edge of the deck similar to the position of aircraft 110 in FIG. 3. The aircraft is, however, secured in a more positive manner. Tie-down chain 228, having hooks at opposite ends, anchors wheel 222 to wheel stop 224. This connection restrains the aircraft from moving inboard. Another cable 234 anchors the aircraft body (236) to wheel stop 224 to further secure the aircraft from outward movement. With the nose wheel of aircraft 210 snubbed to the deck, tie-down chain 234, though extending upwardly at an angle, also restrains lateral movement of the aircraft. Furthermore, it will be observed in FIG. 4 that there is no tie-down chain attachment to walkway bulwark 230, as in FIG. 3, and that passage is unobstructed.

The wheel stop and tie-down according to this invention is subject to severe working conditions and is therefore subjected to load testing for safety. A load test for the tie-down is accomplished by applying a 16,000 pound vertical load on a minimum of 10% of the tie-downs. Any permanent deformation exceeding 1/8″ on the tie-down bar or 1/16″ on the deck structure is cause for rejection.

There has been described a wheel stop which is adapted to be fixed or removably secured to a carrier aircraft flight or elevator deck which (1) prevents aircraft wheels from rolling over the edge, and (2) defines a positive anchor to which cables or chains can be attached for securing an aircraft from movement. It is obvious that many modifications can be made to the stop and tie-down arrangement without departing from the spirit of the invention which is limited only by the claims annexed hereto.

What is claimed is:

1. An aircraft wheel stop and tie-down arrangement for use on carrier flight and elevators decks for securing aircraft in position thereon, comprising:
   - an elongated channel member having flanges connected by a web;
   - one of the flanges having a plurality of spaced apart openings adapted to be received over spaced-apart fastening means extending upwardly from the deck surface along its outboard edge;
   - means for removably securing the one flange onto the fastening means with the web upstanding from the deck whereby the channel member defines an aircraft wheel stop;
   - said channel web and other flange having cut-outs at spaced apart locations along its length;
   - rod means secured to the channel shaped member along the web and other flange and bridging the cut-outs thereof for defining means for receiving cable hooks;
   - a first tie-down chain having hooks adapted for connection between the wheel stop and an aircraft wheel parked inboard thereof; and,
   - a second tie-down chain having hooks adapted for connection between the wheel stop and a position on the aircraft body outboard of the wheel stop;

whereby the aircraft is restrained against movement.

2. The invention according to claim 1 wherein the wheel stop is further defined by the channel member having reinforcing ribs extending between the flanges.

3. The invention according to claim 1 further defined by the wheel stop having cut-outs along the portion adjacent the deck surface for allowing water drainage thereunder.

4. The invention according to claim 1 wherein the channel member is C-shaped.

5. The invention according to claim 1 wherein the channel member is Z-shaped.

* * * * *